E. B. HERMAN.
RUBBER WORKING MACHINE.
APPLICATION FILED NOV. 27, 1914.

1,173,426.

Patented Feb. 29, 1916.
2 SHEETS—SHEET 1.

Witnesses:
E. C. Murphy
A. H. McGlinchey

Inventor:
Edward B. Herman
by Henry J. Miller
atty.

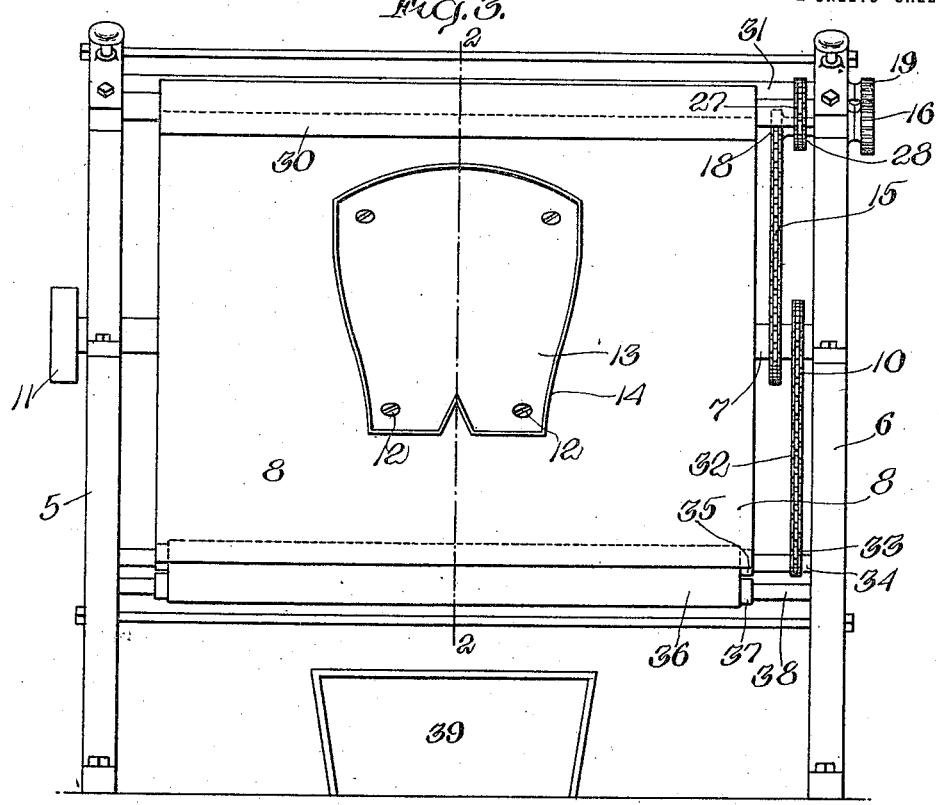
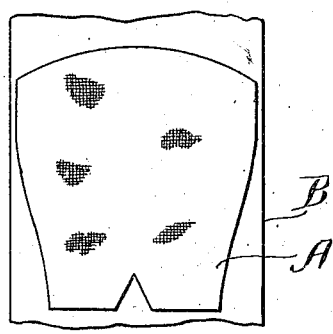
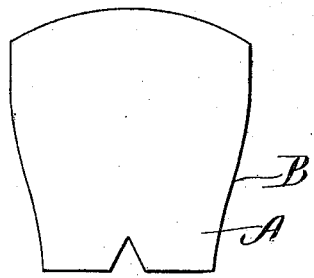

UNITED STATES PATENT OFFICE.

EDWARD B. HERMAN, OF EAST WATERTOWN, MASSACHUSETTS.

RUBBER-WORKING MACHINE.

1,173,426.  Specification of Letters Patent.  Patented Feb. 29, 1916.

Application filed November 27, 1914. Serial No. 874,139.

*To all whom it may concern:*

Be it known that I, EDWARD B. HERMAN, a citizen of the United States, residing at East Watertown, in the county of Middlesex and State of Massachusetts, have invented new and useful Improvements in Rubber-Working Machines, of which the following is a specification, reference being had to the accompanying drawings, forming part thereof.

This invention has reference to improvements in rubber working machines and particularly to improvements in such machines adapted to apply reinforces or strengthening layers to rubber.

One object of this invention is to provide means for applying to a web of material reinforce layers or pieces of a shape and size differing from that of the web.

Another object of the invention is to provide a machine through which a web or strip of rubber may be fed and having means for applying to said rubber at intervals pieces of reinforce material and for trimming the rubber.

Another object of the invention is to provide means for stretching rubber along a line and for applying pressure on said stretched rubber to sever the same.

Other objects of the invention will appear from the following description.

The invention consists in the means for receiving the reinforce and for applying said reinforce to the rubber.

The invention also consists in the novel means for trimming or severing the rubber.

The invention also consists in such other novel features of construction and combination of parts as shall hereinafter be more fully described and pointed out in the claims.

Figure 1:
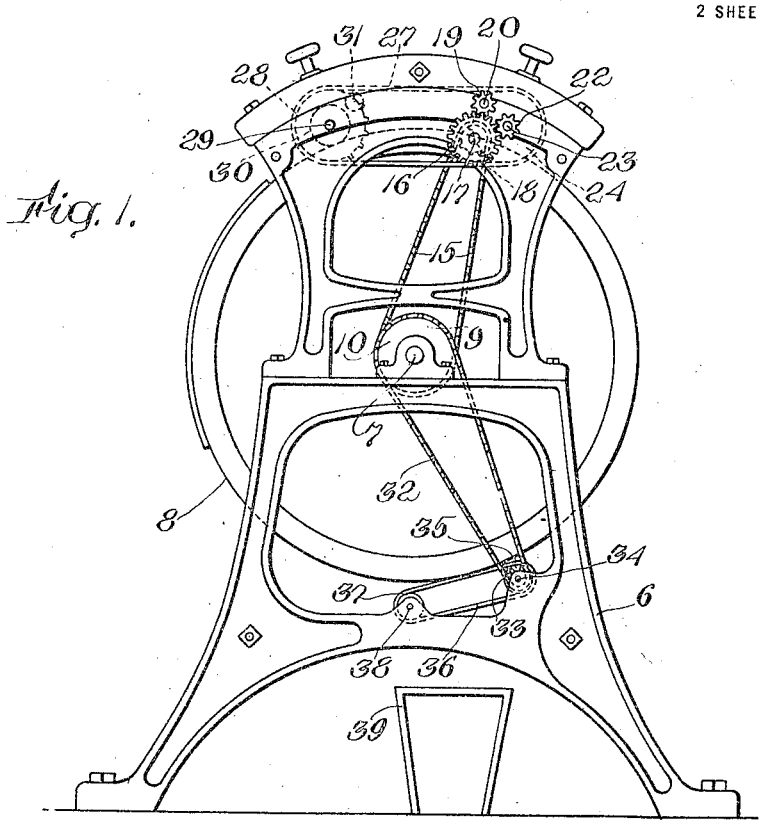
Figure 2:
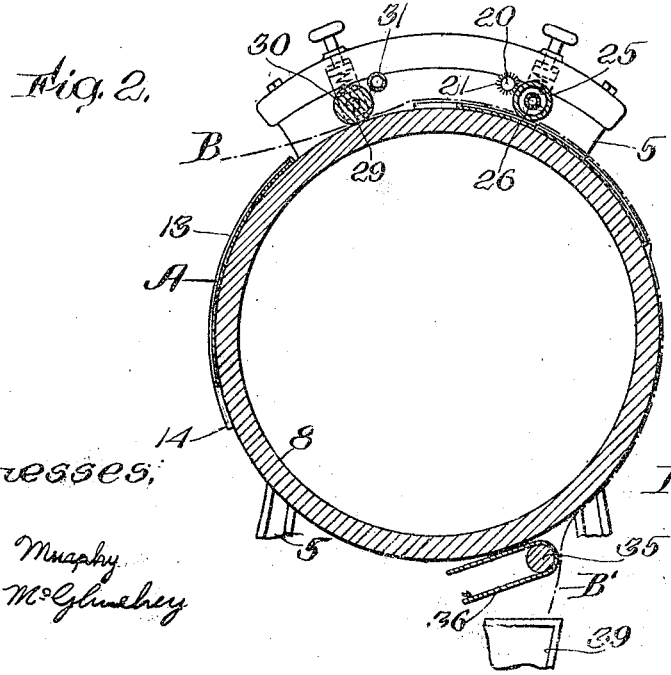

Figure 1, represents a side elevation of the improved machine. Fig. 2, represents a sectional view of parts of the same taken on line 2—2 Fig. 3. Fig. 3, represents the machine in front elevation. Fig. 4, represents a plan view of a piece of rubber having one of the reinforces or linings adapted to be applied by this machine. Fig. 5, represents a similar view of the product of the improved machine herein more particularly referred to.

Similar characters of reference designate corresponding parts throughout.

The machine hereinafter more specifically referred to is adapted to apply the linings, so called, used in the construction of rubber boots to a layer of rubber. These linings A are usually made of textile fabric of some kind and are rubberized sufficiently to facilitate their adhesion to a sheet B of rubber whereby the product of the combination is a piece of textile fabric of the desired shape having a face of rubber. While the part A is herein referred to as a lining it is to be understood that such part is thus referred to for convenience to identify the lining or reinforce from the rubber B. It is also to be understood that these parts or materials A and B are referred to herein without the intention thereby to restrict the invention. The parts or linings A used in the manufacture of rubber boots are, as above stated, usually of textile material to which rubber has been applied. These linings A are the linings or reinforce material for the legs of boots and are of considerable size. Usually said linings are cut from pieces of material by dies and placed between sheets of suitable paper or between the pages of a book. The preparation of such pieces or linings A for use in this improved machine contemplates the production thereof as above described.

One process heretofore employed for applying the linings A to rubber has been to draw forward a web of very soft and adhesive rubber on to a table or flat surface and smooth out said rubber, then to apply one of the linings A to the rubber and smooth the same, then to cut, with shears or a knife, the rubber around the outline of the lining and then to pass the combined lining and rubber between pressure appliances to press the lining and rubber together. Such process, in practice, required the coöperation of several operatives and resulted in the waste of considerable rubber as the pure rubber accidentally folded together will adhere and the folds cannot be separated. It is also found that, in trimming the rubber with hand implements the fabric or lining A is cut. The principal objection to the process heretofore employed has been the amount of time and labor employed therein.

In carrying my invention into practice I have found that by mechanically feeding forward a web or strip of rubber, by mechanically applying to said rubber the linings or reinforces A and by subjecting the combined product to pressure but a single operator would be necessary and no waste of rubber would occur. I have also found that while, in practice, it is difficult to cut thin sheet rubber by means of a die or dies it is comparatively easy and satisfactory to cut or sever such thin rubber by stretching or pressing the same over an edge and applying heat thereto on the line of said edge whereby the stretched or pressed line of the rubber is softened or heated sufficiently to effect the separation of the portions of rubber at the sides of said edge.

In the drawings I have shown this invention as embodied in a machine having the side frames 5 and 6 secured together in any suitable manner and having bearings in which is journaled the main shaft 7 having the cylinder 8, the sprockets 9 and 10, and the pulley 11 which latter may be driven in any suitable manner. Removably secured to the periphery of said cylinder 8, by means of the screws 12 or other well known devices is a form 13 having the edge or lip 14 constituting a pattern of a suitable height and shape to receive within it one of the linings or pieces A. This edge or lip 14 preferably is thin transversely but need not be a cutting edge.

Sprocket 9 has the chain 15 which drives the sprocket 18 of the shaft 17 journaled at the upper portion of frame 6 and having the gear 16 which meshes with the pinion 19 of the brush roll shaft 20, having the brush 21, and with the pinion 22 of the heater roll shaft 23 which latter has the sprocket 24. This heater roll shaft is journaled in spring pressed blocks slidably adjustable in guides of the frames 5 and 6 to permit the heater roll 25 of said shaft 23 to yield. Roll 25 is preferably tubular to receive the gas burner pipe 26 by means of which fuel is supplied to heat said roll 25 and the periphery of this roll 25 is cleaned by the wiping action thereagainst of the brush roll 21.

Sprocket 24 has the chain 27 which drives the sprocket 28 of the presser roll shaft 29 which is journaled in spring pressed blocks slidably adjustable in guides of the frames 5 and 6 and said shaft 29 has the presser roll 30 of comparatively elastic rubber or other suitable yielding material adapted during the rotation of cylinder 8 to receive and conform to the edge 14 of the form 13. Adjacent this presser roll 30 is the water spray pipe 31 which supplies water to said roll to prevent the adhesion of the periphery of said roll and the rubber against which said roll presses.

Sprocket 10 has the chain 32 which drives the sprocket 33 of the shaft 34. This shaft has the roll 35 journaled in bearings of the frames 5 and 6 and driving the endless belt 36 which is sustained also by the companion roll 37 having its shaft 38 journaled in bearings of said frames 5 and 6. The purpose of this belt 36 is to strip or guide any scrap rubber from the periphery of the cylinder 8 to a point where said scrap may fall or pass into the funnel 39 and be returned to be reworked into a web.

In the operation of the machine the web B of comparatively pure rubber is led between the peripheries of the cylinder 8 and the presser roll 30, cylinder 8 is now rotated and motion is transmitted to the various rolls 20, 25 and 30 by means of the driving gear and chains above described. Heat is supplied to the roll 25 by the combustion of gas from the gas pipe 26. When, in the rotation of cylinder 8, one of the forms 13 is brought to a convenient position an operative places and smooths in said form one of the linings A which lining preferably is not thick enough to fill said form 13 to the full depth of the edge or lip 14. The continued rotation of cylinder 8 carries such form 13 with its lining 8 beneath or in contact with the rubber web B and beneath the elastic roll 30 by which pressure is applied to press the web B in intimate contact with the lining A so that these parts may adhere. By reason of the elastic nature of the roll 30 the edge 14 of the form 13 is received in the material of said roll and the rubber web B is stretched over said edge 14 and is pressed against and usually adheres to the periphery of cylinder 8 outside the edge or lip 14, so that the rubber stretched and thus diminished in thickness over the edge or lip 14 is in particularly good condition to be severed by pressure applied thereto especially when such pressure is combined with the application of heat. As the cylinder 8 continues to rotate the form 13 with the stretched web of rubber B is brought beneath the roll 25 which roll having a periphery of comparatively rigid material rides against the rubber stretched over the edge 14 of said form 13, the heat of said roll 25 softens or, in some cases, burns the rubber with which it contacts and said combined heat and pressure effects the severing of the rubber web along the line of the edge or lip 14, the final severing of the rubber being somewhat assisted by the retraction of the stretched rubber. After the form 13 passes beyond the roll 25 the piece of reinforced material can be removed from said form. When the first end of the web is carried around by the cylinder 8 to a point adjacent the belt 36 it is stripped from the cylinder and led to the funnel 39 as scrap B', and thereafter the action of belt 36 is to continue the stripping of said scrap from the cylinder.

The purpose of removably securing the forms 13, 13 to the cylinder 8 is that several sizes of these forms are used in producing reinforced tops for boots and that, for some purposes, it may be desirable to substitute forms 13 of different shape from those on the cylinder.

This improved machine can be operated by a single operator without waste of material and the product may be manufactured at much less cost than as heretofore.

In the embodiment of my invention shown in the drawings the application of the rubber web to the lining or reinforce material, the stretching of the rubber along the line on which it is proposed to sever the same and the subjection of such stretched line of rubber to pressure is carried out as a progressive operation and such a machine is usually to be preferred but, by such disclosure, I do not intend thereby to limit my invention to a machine in which the various steps described are carried out as a continuous progressive operation.

It is also apparent that the temperature of the roll 25 may be more or less depending upon the pressure of said roll and on the nature and thickness of the rubber web. For some kinds of rubber it is apparent that roll 25 need not be heated.

While I have herein pointed out advantages of my improved machine when used to apply linings or reinforces A to rubber it is of course evident that the omission of said linings or reinforces from the forms 13 will not necessarily depart essentially from my invention as the raised edge or pattern 14 of said form may be utilized for cutting out portions of the web B without reference to the application to such portions of reinforcements of any kind. When used as a rubber severing device the pattern of the edge 14 may be such that any shape may be cut from the rubber B and the remainder of said rubber B would, in such event, not be considered as waste but could be used in the manufacture of boots, shoes or other articles.

Having thus described my invention I claim as new and desire to secure by Letters Patent.

1. A rubber working machine comprising a carrier member, a form carried thereby and having a raised edge to receive within it a backing, means coöperating with said form to press a sheet of rubber into adhesive contact with a backing in said form, and pressure means coöperating with said raised pattern to effect the severing of said rubber.

2. A rubber working machine comprising a rotary carrier, a form on said carrier having a depression adapted to receive a fabric, a roller positioned to press a sheet of rubber into firm adhesive contact with a fabric contained in the depression of said form, and a second roller adapted to operate on the rubber sustained by the raised portions of said form to effect the severing of said rubber along the outline of such raised portions.

EDWARD B. HERMAN.

Witnesses:
HENRY J. MILLER,
ESTHER C. MURPHY.